(12) United States Patent
Anguiano et al.

(10) Patent No.: US 12,297,126 B1
(45) Date of Patent: *May 13, 2025

(54) MODULAR POROUS SWALE

(71) Applicant: The United States of America, as represented by the Secretary of the Navy, Arlington, VA (US)

(72) Inventors: Gary Anguiano, Oxnard, CA (US); Dennis How, Camarillo, CA (US); Mark Foreman, Santa Barbara, CA (US); James Thomas Pilkington, Ventura, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 516 days.

This patent is subject to a terminal disclaimer.

(21) Appl. No.: 17/709,551

(22) Filed: Mar. 31, 2022

Related U.S. Application Data (63) Continuation-in-part of application No. 17/117,244, filed on Dec. 10, 2020, now Pat. No. 11,332,383, (Continued)

(51) Int. Cl.
| | | |
|---|---|---|
| *C02F 1/00* | (2023.01) | |
| *B01D 15/10* | (2006.01) | |
| *B01D 39/14* | (2006.01) | |
| *C02F 1/28* | (2023.01) | |
| *E01C 11/22* | (2006.01) | |
| *E02B 11/00* | (2006.01) | |

(Continued)

(52) U.S. Cl.
CPC ............. *C02F 1/004* (2013.01); *B01D 15/10* (2013.01); *B01D 39/14* (2013.01); *C02F 1/281* (2013.01);
(Continued)

(58) Field of Classification Search
CPC ......... B01D 15/10; B01D 39/14; C02F 1/004; C02F 1/281; C02F 1/283; C02F 2103/001;
(Continued)

(56) References Cited

U.S. PATENT DOCUMENTS 6,146,051 A 11/2000 Pratt
6,206,607 B1 3/2001 Medico, Jr.
(Continued)

FOREIGN PATENT DOCUMENTS

EP 1146176 A1 10/2001

OTHER PUBLICATIONS

Wikipedia, Pervious concrete, Sep. 25, 2019, United States.
Bio Microbics, d-Rain Joint, brochure, 2016, United States.

*Primary Examiner* — Patrick Orme
(74) *Attorney, Agent, or Firm* — Naval Facilities Engineering and Expeditionary Warfare Center; Jimmy M. Sauz (57) ABSTRACT

A modular porous swale. The modular porous swale may comprise a porous concrete block and filtration joint. The porous concrete block may snugly fit within a trench having a lower portion filled with an absorption media. The absorption media may include gravel, activated alumina, bone char, biochar, bone char and activated alumina mixture, and biochar and activated alumina mixture. The porous concrete block may have a top surface inwardly-sloped to a nadir. The filtration joint may be disposed within the porous concrete block and along the nadir. The liner may cover one or more sides of the porous concrete block. The perforated pipe may be located within the absorption media. The filtration joint may substantially align above a portion of the perforated pipe when the modular porous swale is installed within the trench.

20 Claims, 8 Drawing Sheets

Related U.S. Application Data which is a continuation of application No. 16/732,946, filed on Jan. 2, 2020, now Pat. No. 10,899,633.

(51) Int. Cl.
*E03F 1/00* (2006.01)
*C02F 103/00* (2006.01)

(52) U.S. Cl.
CPC ............ *C02F 1/283* (2013.01); *E01C 11/225* (2013.01); *E02B 11/00* (2013.01); *E03F 1/00* (2013.01); *C02F 2103/001* (2013.01); *C02F 2201/004* (2013.01)

(58) Field of Classification Search
CPC .. C02F 2201/004; E01C 11/225; E02B 11/00; E03F 1/00
See application file for complete search history.

(56) References Cited

U.S. PATENT DOCUMENTS

| | | | |
|---|---|---|---|
| 8,137,024 | B2 | 3/2012 | Kaul |
| 8,771,506 | B2 | 7/2014 | Pomerleau |
| 8,974,664 | B2 | 3/2015 | Beatt |
| 10,899,633 | B1* | 1/2021 | Anguiano ............ B01D 39/04 |
| 11,332,383 | B1* | 5/2022 | Anguiano ............ E03F 1/002 |
| 2007/0031192 | A1 | 2/2007 | Murfin |
| 2008/0023383 | A1 | 1/2008 | Sansalone |
| 2010/0096333 | A1 | 4/2010 | Foreman |
| 2010/0108586 | A1 | 5/2010 | Qin |
| 2010/0150654 | A1 | 6/2010 | Shaw |
| 2010/0200480 | A1 | 8/2010 | Kania |
| 2018/0274182 | A1 | 9/2018 | Buch |

* cited by examiner

MODULAR POROUS SWALE

CROSS-REFERENCE TO RELATED APPLICATIONS

This application is a continuation-in-part patent application of the commonly owned, U.S. patent application Ser. No. 17/117,244, titled "Modular Porous Swale," filed on Dec. 10, 2020 by co-inventors Gary Anguiano, Dennis How, and Mark Foreman, the contents of which are hereby expressly incorporated herein by reference in its entirety and to which priority is claimed. U.S. patent application Ser. No. 17/117,244 is a continuation patent application of the commonly owned U.S. Pat. No. 10,899,633, titled "Modular Porous Swale Filtration System," issued on Jan. 26, 2021 by co-inventors Gary Anguiano, Dennis How, and Mark Foreman, the contents of which are also hereby expressly incorporated herein by reference in its entirety and to which priority is claimed.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to swales, and more particularly, to pre-fabricated swales designed for storm water filtration.

BACKGROUND

Industrial and commercial sites may allow storm water runoff to flow into a water retention area, body of water, or a processing facility. Toxic metals, suspended solids, and other pollutants, however, flow from the storm water runoff and can lead to pollution of waterways. Industrial sites that operate and maintain ships, aircraft, and vehicles, for example, are generally prone to high levels of pollutants in their storm water. Additionally, facilities that galvanize sheathed materials (siding or roofing, for instance) or otherwise coated with paints containing copper and zinc may also leach significant levels of toxic metals into the environment. In that regard, it is desirable to have an efficient and cost-effective apparatus that can remove toxic metals and suspended solids from storm water runoff.

SUMMARY OF ILLUSTRATIVE EMBODIMENTS

To minimize the limitations in the related art and other limitations that will become apparent upon reading and understanding the present specification, the following discloses embodiments of a new and useful modular porous swale filtration system.

One embodiment may be a modular porous swale filtration system, comprising: one or more modular porous swales, each having: a porous concrete block with a top surface that is inwardly-sloped to a nadir; and a filtration joint disposed within the porous concrete block and positioned substantially along the nadir, such that a portion of a liquid located on the top surface of the porous block flows towards the nadir, through the filtration joint, and beneath the porous concrete block. The modular porous swale filtration system may further comprise a perforated pipe and an absorption media; wherein the absorption media may be located within a lower portion of a trench; wherein the one or more modular porous swales may be adapted to snugly fit within an upper portion of the trench and directly above the absorption media; wherein the perforated pipe may be located within the absorption media and traverse along a length of the trench; and wherein the filtration joint may substantially align above a portion of the perforated pipe when the one or more modular porous swales are installed within the trench. The absorption media may be bone char. The absorption media may be activated alumina. The absorption media may be a bone char and activated alumina mixture. The filtration joint may be constructed of reticulated foam. The one or more modular porous swales may further comprise one or more lift anchors, each having a notch and a pin traversing therethrough.

Another embodiment may be a modular porous swale filtration system, comprising: one or more modular porous swales, each comprising: a porous concrete block adapted to snugly fit within a trench and having a top surface that is inwardly-angled to a nadir located along a centerline of the porous concrete block; and a filtration joint disposed within the porous concrete block and positioned along the nadir, such that the filtration joint may be substantially aligned with the centerline of the porous concrete block, thereby allowing a portion of a liquid located on the top surface of the porous concrete block to flow towards the centerline, through the filtration joint, and beneath the porous concrete block; and a liner covering one or more surfaces of the trench. The modular porous swale filtration system may further comprise a perforated pipe and an absorption media; wherein the absorption media may be located within a lower portion of the trench; wherein the one or more modular porous swales may be positioned above the absorption media when the one or more modular porous swales are installed within the trench; and wherein the perforated pipe may be located within the absorption media and traverse along a length of the trench, such that the filtration joint may substantially align above a portion of the perforated pipe. The absorption media may be bone char. The absorption media may be activated alumina. The absorption media may be a bone char and activated alumina mixture. The filtration joint may be constructed of reticulated foam. The one or more modular porous swales may further comprise one or more lift anchors, each having a notch and a pin traversing therethrough. The liner may be selected from the group of liners consisting of: a polyethylene and a polypropylene.

Another embodiment may be a modular porous swale filtration system, comprising: one or more modular porous swales, each having: a porous concrete block adapted to snugly fit within a trench and having a top surface that is inwardly-sloped to a nadir located along a centerline of the porous concrete block; a filtration joint disposed within the porous concrete block and positioned along the nadir, such that the filtration joint may be substantially aligned with the centerline of the porous concrete block, allowing a portion of a liquid located on the top surface of the porous block to flow towards the centerline, through the filtration joint, and beneath the porous concrete block; and a plurality of concrete support units for filling a lower portion of the trench to provide vertical loading support to the porous concrete block. Each of the plurality of concrete support units comprises a hollow interior filled with an absorption media. The absorption media may be selected from the group of absorption media consisting of: an activated alumina, a bone char, and a bone char and activated alumina mixture. The filtration joint may be constructed of reticulated foam. The one or more modular porous swales may further comprise one or more lift anchors, each having a notch and a pin traversing therethrough.

Another embodiment may be a modular porous swale, comprising: a porous concrete block with a top surface that is inwardly-sloped to a nadir; and a filtration joint disposed within the porous concrete block and positioned substantially along the nadir, such that a portion of a liquid located on the top surface of the porous block may flow towards the nadir, through the filtration joint, and beneath the porous concrete block; wherein the modular porous swale may be adapted to snugly fit within an upper portion of a wrench; and wherein an absorption media may be located within a lower portion of the trench, such that the modular porous swale may be directly above the absorption media. A perforated pipe may be located within the absorption media and may traverse along a length of the trench; and wherein the filtration joint may be configured to substantially align above a portion of the perforated pipe when the modular porous swale is installed within the trench. The absorption media may be bone char. The absorption media may be biochar. The absorption media may be activated alumina. The absorption media may be a biochar and activated alumina mixture. The absorption media may be a bone char and activated alumina mixture.

Another embodiment may be a modular porous swale, comprising: a porous concrete block adapted to snugly fit within a trench and having a top surface that is inwardly-angled to a nadir located along a centerline of the porous concrete block; a filtration joint disposed within the porous concrete block and positioned along the nadir, such that the filtration joint may be substantially aligned with the centerline of the porous concrete block, thereby allowing a portion of a liquid located on the top surface of the porous concrete block to flow towards the centerline, through the filtration joint, and beneath the porous concrete block: a liner substantially covering one or more sides of the porous concrete block, such that the liner may substantially cover one or more surfaces of the trench; wherein an absorption media may be located within a lower portion of the trench; and wherein the modular porous swale may be positioned directly above the absorption media when the modular porous swale is installed within the trench. A perforated pipe may be located within the absorption media and may traverse along a length of the trench, such that the filtration joint may be configured to substantially align above a portion of the perforated pipe. The absorption media may be bone char. The absorption media may be biochar. The absorption media may be activated alumina. The absorption media may be a biochar and activated alumina mixture. The absorption media may be a bone char and activated alumina mixture. The liner may be selected from the group of liners consisting of: a polyethylene and a polypropylene.

Another embodiment may be a modular porous swale, comprising: a porous concrete block adapted to snugly fit within a trench and having a top surface that is inwardly-sloped to a nadir located along a centerline of the porous concrete block; and a filtration joint disposed within the porous concrete block and positioned along the nadir, such that the filtration joint may be substantially aligned with the centerline of the porous concrete block, allowing a portion of a liquid located on the top surface of the porous block to flow towards the centerline, through the filtration joint, and beneath the porous concrete block; wherein a lower portion of the trench may include a plurality of concrete support units to provide vertical loading support to the porous concrete block; and wherein each of the plurality of concrete support units may comprise a hollow interior filled with an absorption media. The absorption media may be a biochar. The absorption media may be an activated alumina. The absorption media may be a biochar and activated alumina mixture. The absorption media may be a bone char and activated alumina mixture.

It is an object to provide a system and apparatus that filters storm water pollutants. The modular porous swale filtration system may be used at industrial, commercial, or remediation sites that are currently exceeding storm water pollutant limits or otherwise posing a risk to nearby receiving water bodies. The modular porous swale filtration system can be applied directly downstream of source (i.e., roadways and facilities that are the source of particulate and dissolved heavy metals, oils and grease, and suspended solids) to reduce storm water pollution near its source.

It is an object to provide a filtering apparatus and system that it is simple, passive (no power requirements), small footprint, modular, easy to maintain, durable, portable, adaptable, and has a low profile (unobtrusive to site operations) to capture heavy metal pollutants sediment at challenging sites where physical constraints limit the use of conventional storm-water treatment technologies. The modular porous swale filtration system may be particularly useful at sites where the discharge outfall is at a shallow depth, or when the site is obstructed by underground utilities, has limited space, and lacks a sufficient elevation drop to allow passive treatment.

It is an object to provide a modular porous swale filtration system that can be deployed as treatment best management practices (BMP) for pollutant removal (as a retrofit) directly downstream of primary contaminant sources (e.g., hotspots) with minimal construction effort.

It is an object to provide a modular porous swale filtration system configured for shallow depth. In this manner, embodiments of the system may only require shallow excavation for trenches, thereby allowing installation of the modular porous swales at sites with depth constraints.

It is an object to provide a modular porous swale filtration system that can be deployed as a pretreatment to more complex downstream treatment trains.

It is an object to provide a modular porous swale filtration system that increases storm water sediment capture and water infiltration on-site.

It is an object to provide a modular porous swale filtration system that is modular and can be easily deployed on existing pavement with minimal demolitions and construction effort.

It is an object to provide a system with modular porous swales having lift anchors or lift points. In this manner, each modular porous swale may be easily removed for advanced cleaning, including vacuuming or unit replacement.

It is an object to provide a modular porous swale filtration system that can be easily installed and maintained with minimal downtime to nearby operations.

It is an object to provide a modular porous swale filtration system designed to withstand routine vehicle traffic loads.

It is an object to overcome the limitations of the prior art.

These, as well as other components, steps, features, objects, benefits, and advantages, will now become clear from a review of the following detailed description of illustrative embodiments, the accompanying drawings, and the claims;

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

DETAILED DESCRIPTION OF ILLUSTRATIVE EMBODIMENTS

In the following detailed description, numerous specific details are set forth in order to provide a thorough understanding of various aspects of one or more embodiments of the modular porous swale filtration system. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc. . . . , to provide a thorough understanding of the embodiments. One skilled in the relevant art will recognize, however, that the scope of protection can be practiced without one or more of the specific details, or with other methods, components, materials, etc., In other instances, well-known structures, materials, or operations are generally not shown or described in detail to avoid obscuring aspects of the disclosure.

DEFINITIONS

In the following description, certain terminology is used to describe certain features of the embodiments of the modular porous swale filtration system. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value.

As used herein the term "somewhat" refers to a range of values of ±50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

By way of illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

This same principle applies to ranges reciting only one numerical value and should apply regardless of the breadth of the range or the characteristics being described.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described.

As used herein in this disclosure, the singular forms "a" and "the" may include plural referents, unless the context clearly dictates otherwise.

The present disclosure relates generally to prefabricated swales designed to filter pollutants from storm water runoff. In general, storm water runoff originating from rain and melting snow may flow from industrial and commercial sites and into a water retention area, body of water, or a processing facility. Developed areas, which are generally covered by buildings and pavement, may prevent water from soaking into the ground, and as a result, may utilize storm sewers to collect and guide storm water into nearby waterways or treatment devices. Examples of such waterways may include stream beds, rivers, or lakes. Examples of treatment devices may include rain gardens, swales, infiltration practices, wet ponds, and bioretention systems.

Storm water generally contains toxic metals, suspended solids, and other pollutants, however, which can lead to pollution of waterways. These types of pollutants can harm fish and wildlife populations, kill native vegetation, foul drinking water supplies, and make recreational areas unsafe and unpleasant. Industrial sites that operate and maintain ships, aircraft, and vehicles, for example, are generally prone to high levels of pollutants in their storm water. Facilities that galvanize sheathed materials may also leach significant levels of toxic metals into the environment.

Embodiments of the modular porous swale filtration system solve this problem by filtering and removing toxic metals and suspended solids from storm water runoff. Specifically, embodiments of the modular porous swale filtration system may be installed in trenches subject to storm water runoff. Storm water containing pollutants may flow from paved areas and towards the modular porous swale filtration system. There, suspended solids are filtered out via a porous concrete block and reticulated foam filter. The filtered water may then flow into adsorbent media located below the porous concrete block and housed in a contained trench. As the filtered water flows through the modular porous swales, sediment, particles, and contaminants of metal may be filtered out. Ultra-fine particulate or metal ions passing through the mechanical filtration may also be absorbed onto the underlying adsorbent material(s) specifically designed for the upstream contaminants. Various types of absorbent media used may depend on site conditions. Additionally, the treated water exiting the porous concrete block may drain into a perforated pipe traversing across the trenches and disposed within the absorbent media. The performed pipe may also be sloped to additional treatment facilities or to an adjacent storm water outfall.

The embodiments may be used in industrial, commercial, or remediation sites that are currently exceeding storm water pollutant limits or otherwise posing a risk to nearby receiving water bodies. The embodiments can also be directly installed downstream of the source. (e.g., roadways and facilities that are the source of particulate and dissolved heavy metals, oils and grease, and suspended solids) to reduce storm water pollution near its source.

In the accompany drawings, like reference numbers indicate like elements. Reference characters 10, 20, 30, 40 depict multiple embodiments of the modular porous swale filtration system. Reference characters 1000, 2000, 3000, 4000 depict multiple embodiments of the modular porous swale.

Figure 1A:
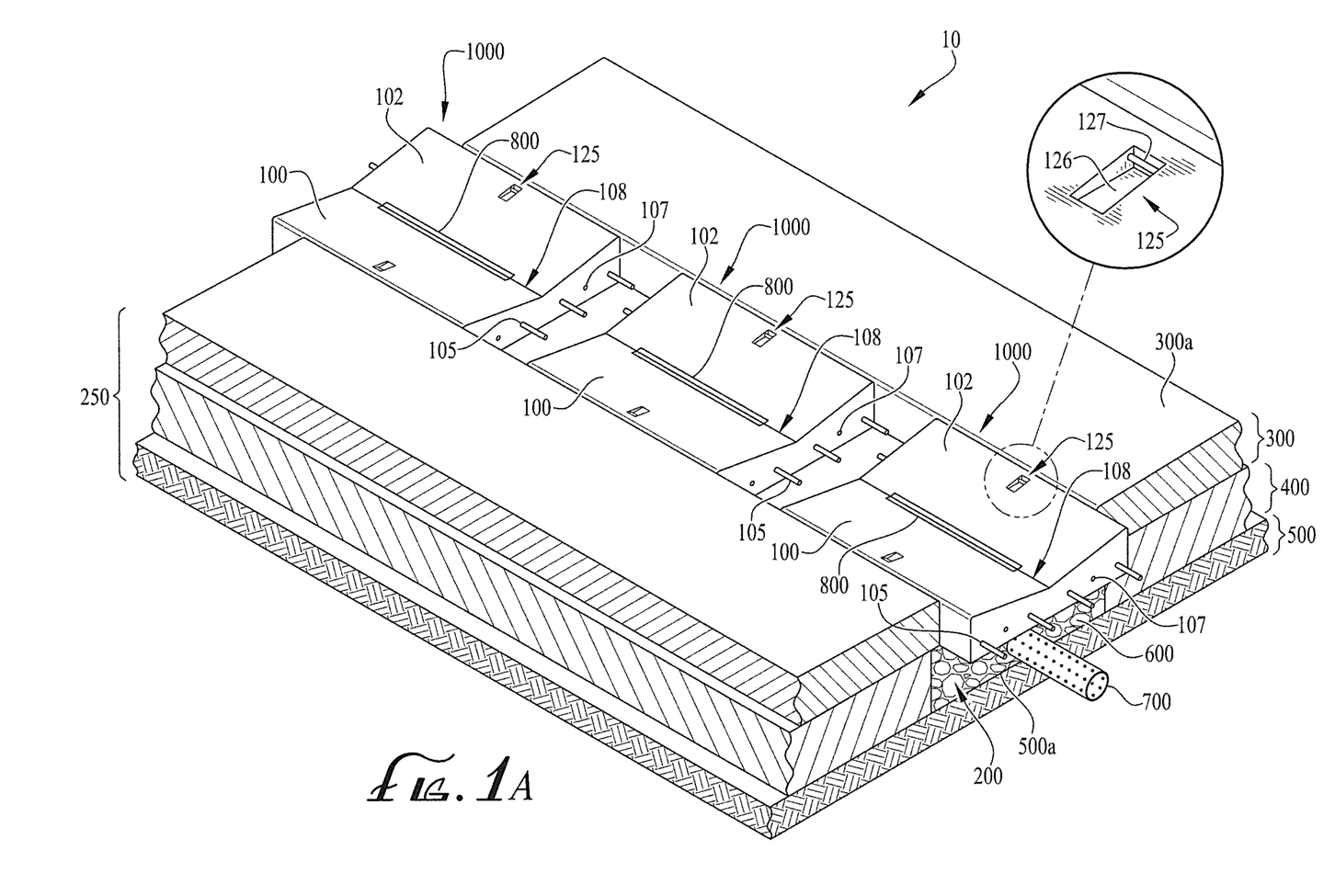
FIGS. 1A to 1C are illustrations of a perspective view, top view, and cross section view; respectively, of a modular porous swale filtration system, according to a first embodiment of the present disclosure.
Figure 1B:
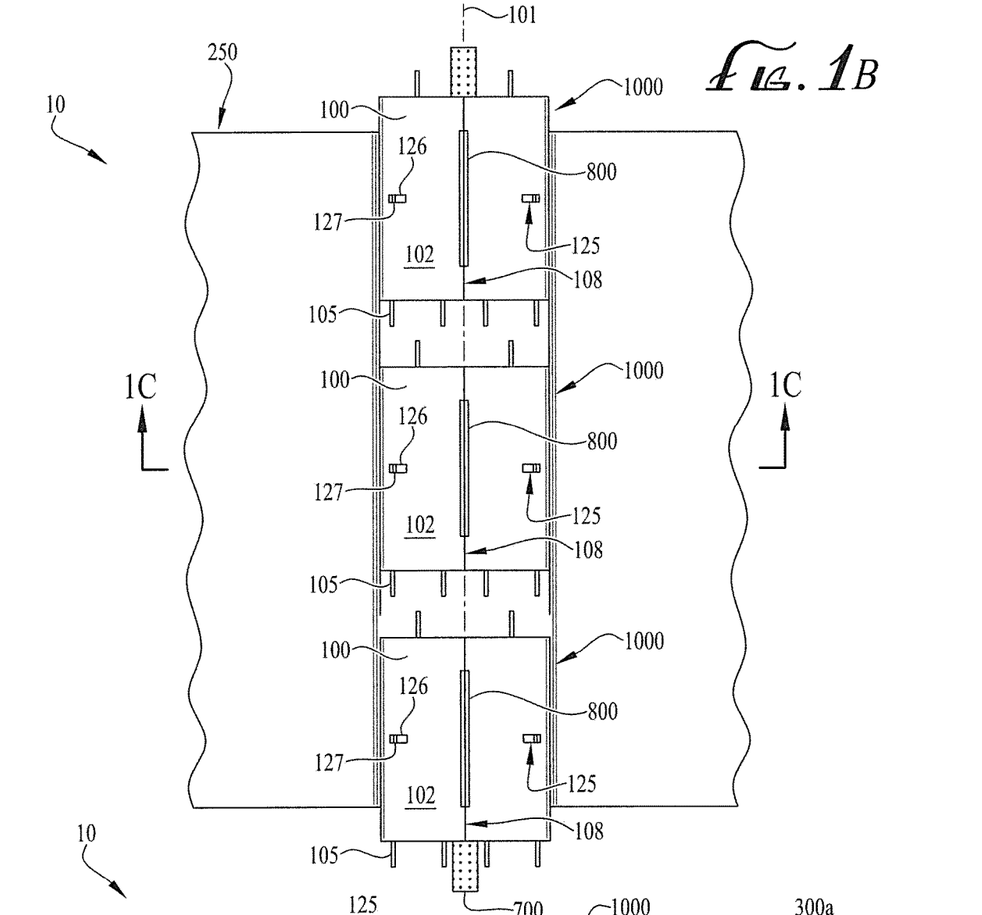
Figure 1C:
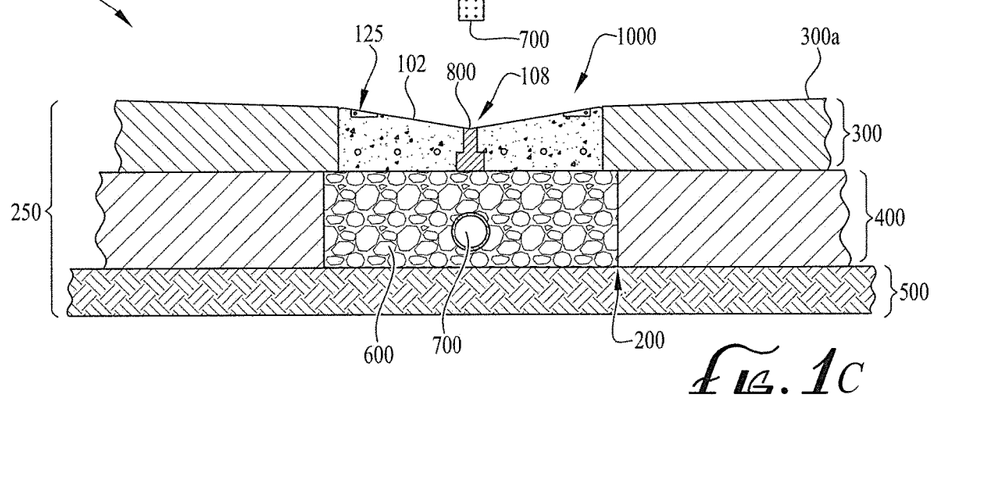

FIGS. 1A to 1C are illustrations of a perspective view, top view, and cross section view, respectively, of a modular porous swale filtration system 10, according to a first embodiment of the present disclosure. As shown in FIGS. 1A to 1C, a first embodiment of the modular porous swale filtration system 10 may comprise one or more modular porous swales 1000, absorption media 600, and a perforated pipe 700. FIGS. 1A to 1C show that the modular porous swale filtration system 10 may be installed and snugly fit within a trench 200. The trench 200 may be a long narrow ditch within a ground 250, and embodiments of the trench 200 may include an asphalt layer 300, base layer 400, and subgrade layer 500. The base layer 400 may comprise fill designed to support and withstand various loads and is preferably disposed between the subgrade layer 500 and asphalt layer 300. The subgrade layer 500 may be native soil, whereas the asphalt layer 300 may be a top surface mixture, comprising primarily of hydrocarbons such as stone gravel, sand, and bitumen.

The depth of the trench 200 may extend between the top surface 300a of the asphalt layer 300 and the top surface 500a of the subgrade layer 500. The lower portion of the trench 200 may be filled with the absorption media 600 for filtering additional pollutants. Preferably, the perforated pipe 700 traverses or extends along the length of the trench 200, beneath the modular porous swales 1000 and within the absorption media 600, as shown in FIGS. 1A and 1C. Preferably, various embodiments of the absorption media 600 may fill the lower portion of the trench 200, such that the fill of the absorption media 600 may be about the same elevation as the base layer 400. In other embodiments, the absorption media 600 may fill the trench 200 at an elevation above the base layer 400. In an exemplary embodiment, the modular porous swales 1000 may be designed to fill the remaining space of the trench 200, such that the modular porous swales 1000 are above the absorption media 600 within the trench 200 and approximately within the same elevation as the asphalt layer 300. Preferably, the top surface 102 of the modular porous swales 1000 may be about the same elevation as the asphalt layer 300 or lower.

Referring to the absorption media 600, the absorption media 600 may be material or a composition that absorbs ultra-fine particulate or metal ions from the filtered water. The absorption media 600 may also serve as a dual media filtration treatment—that is, the absorption media 600 may effectively remove dissolved metals while have a top layer that easily clogs suspended solids. Examples of such absorption media 600, according to various embodiments, may include, without limitation, rock, gravel, bone char, biochar, activated alumina, a bone char and activated alumina mixture, or a biochar and activated alumina mixture. The activated alumina may be manufactured by any process that produces a very large surface area on each particle of alumina, and the large surface area may be manifested by a very rough surface characterized by small pits, voids, and other surface irregularities. These surface irregularities may be effective at capturing small particles that impinge on the surface. Preferably, the activated alumina may be manufactured in such a way that the surface has a net negative electrical charge, thereby allowing positively charged ions, such as certain metals, to attach themselves to the activated alumina. Coating with other chemical compounds can modify the surface of the activated alumina. An example of one such surface coating may be iron sulfide.

Regarding the bone and biochar compositions, the bone char composition may be derived from calcined ground slaughter house bones, which are preferably heated in the absence of oxygen. The bone char composition may comprise carbon and tri-calcium phosphate and may further filter out additional pollutants. Biochar composition may be derived from carbonized biomass heated in the absence of oxygen. Biomass may include organic material such as wood chips, plant matter, manure, or agricultural waste.

Importantly, FIGS. 1A to 1C depict an embodiment of the modular porous swale 1000, comprising: a porous concrete block 100 and a filtration joint 800. The porous concrete block 100 may be a precast concrete mass with high porosity that allows water from precipitation and other sources to pass directly through. In this manner, the porous concrete block 100 may filter suspended solids and pollutants while allowing groundwater recharge. The term "precast" generally refers to hardening and formation of the porous concrete block 100 prior to its usage as the porous modular swale 1000. In various embodiments, the porous concrete block 100 may have one or more hollow cavities and may have sides that are cast smooth or with a design. In use, each modular porous swale 1000 may be installed side-by-side and may be held together via guides 105 and holes 107 to form the modular porous swale filtration system 10. An embodiment of the porous concrete block may be manufactured by Storm Crete Porous Technologies, LLC located in Portland, Maine.

Importantly, the porous concrete block 100 may have a top surface 102 that is inwardly-sloped to a nadir 108, which is preferably the lowest elevational point of the top surface 102. The nadir 108 may be located in different areas of the top surface 102, but, in an exemplary embodiment, the nadir 108 preferably traverses along the centerline 101 of the porous concrete block 100.

In multiple embodiments, the porous concrete block 100 may be between approximately one to three feet in width and between approximately one to five feet in length. For example, the first embodiment of the porous concrete block 100 may have a width of approximately 1 feet 8 inches and a length of approximately 2 feet. Regarding the height of the porous concrete block 100, the height may depend on the elevation of the asphalt layer 300. For example, given that one embodiment of the absorption media 600 may substantially fill the lower portion of the trench 200 at an elevation equal to the base layer 400, the height of the porous concrete block 100 is preferably equal to or less than the height of the asphalt layer 300. Thus, when modular porous swales 1000 are installed within the upper portion of the trench 200, the elevation of the top surfaces 102 of the modular porous swales 1000 is less than or equal to the elevation of the top surface of the ground. In this manner, storm water may flow towards the porous modular swale 1000 and downwards towards the nadir 108.

The filtration joint 800 may be a drainage channel installed within the porous concrete block 100 and may permit flow of water therethrough. The filtration joint 800 may be constructed with reticulated foam and may be used in conjunction with the porous concrete block 100 to filter liquids. In that regard, the filtration joint 800 may minimize or eliminate potential pollutants found within the storm water. Preferably, as shown in FIGS. 1A to IC, the filtration joint 800 may be disposed within the porous concrete block 100 and positioned substantially along the nadir 108. This allows liquid such as storm water located on the top surface of the ground 300*a* or porous block 100 to flow towards the nadir 108, through the filtration joint 800, and beneath the porous concrete block 100.

In multiple embodiments, the filtration joint 800 may be between approximately three to five inches in height and may be between approximately one to three feet in length. For example, the first embodiment of the filtration joint 800 may have a height of approximately 3¼ inches and a length of approximately 1 feet 4 inches. Embodiments of the filtration joint may be manufactured by Biometrics located in Lenexa, Kansas.

In some embodiments, each porous concrete block 100 may comprise one or more lift anchors 125 configured for lifting the porous concrete block 100 off the ground. The lift anchors 125 may also be used for repositioning each modular porous swale 1000 along a trench 200 or ditch. Importantly, the lift anchors 125 may enable a user to readily remove each modular porous swale 1000 off the ground for cleaning and maintenance. In this manner, the user may remedy clogging of the pores by vacuuming or replacing each unit with another modular porous swale 1000. Otherwise, without the capability of removing each modular porous swale 1000 from the ground, vacuuming with common street cleaning vehicles may only be the available option to remedy clogging, resulting with diminishing of infiltration effect over time. Therefore, the modular porous swale filtration system 10 helps improve maintenance in those areas associated with large footprint areas to ensure infiltration and storm water quality.

Each lift anchor 125 may comprise a notch 126 and a pin 127, and the pin 127 preferably extends or traverses through the notch 126. This may allow a hook or clutch device to mate or engage with the pin 127 in order to assist in securing and lifting a modular porous swale 1000, as desired.

In operation, storm water containing pollutants may flow from paved areas to the modular porous swale filtration system 10. Each modular porous swale 1000 may filter out suspended solids via porous concrete (e.g., porous concrete block 100) and reticulated foam filter (e.g., filtration joint 800). As the storm water runs through the modular porous swales 1000, sediment and particles of metal may filter out of the water as well as any contaminants that are naturally bonded to the suspended particles. The filtered water may then infiltrate a bed of absorption media 600 housed within a lower portion of a trench 200. There, ultra-fine particulate or metal ions passing through the mechanical filtration may be absorbed by the absorption media 600 specifically designed for the upstream contaminants. The treated water may then drain into the perforated pipe 700, which may be sloped to guide the treated water into additional treatment facilities or an adjacent storm water outfall. Other embodiments of the modular porous swale filtration system may further comprise a liner to ensure that no pollutant enters the native soil or ground water.

Figure 2:
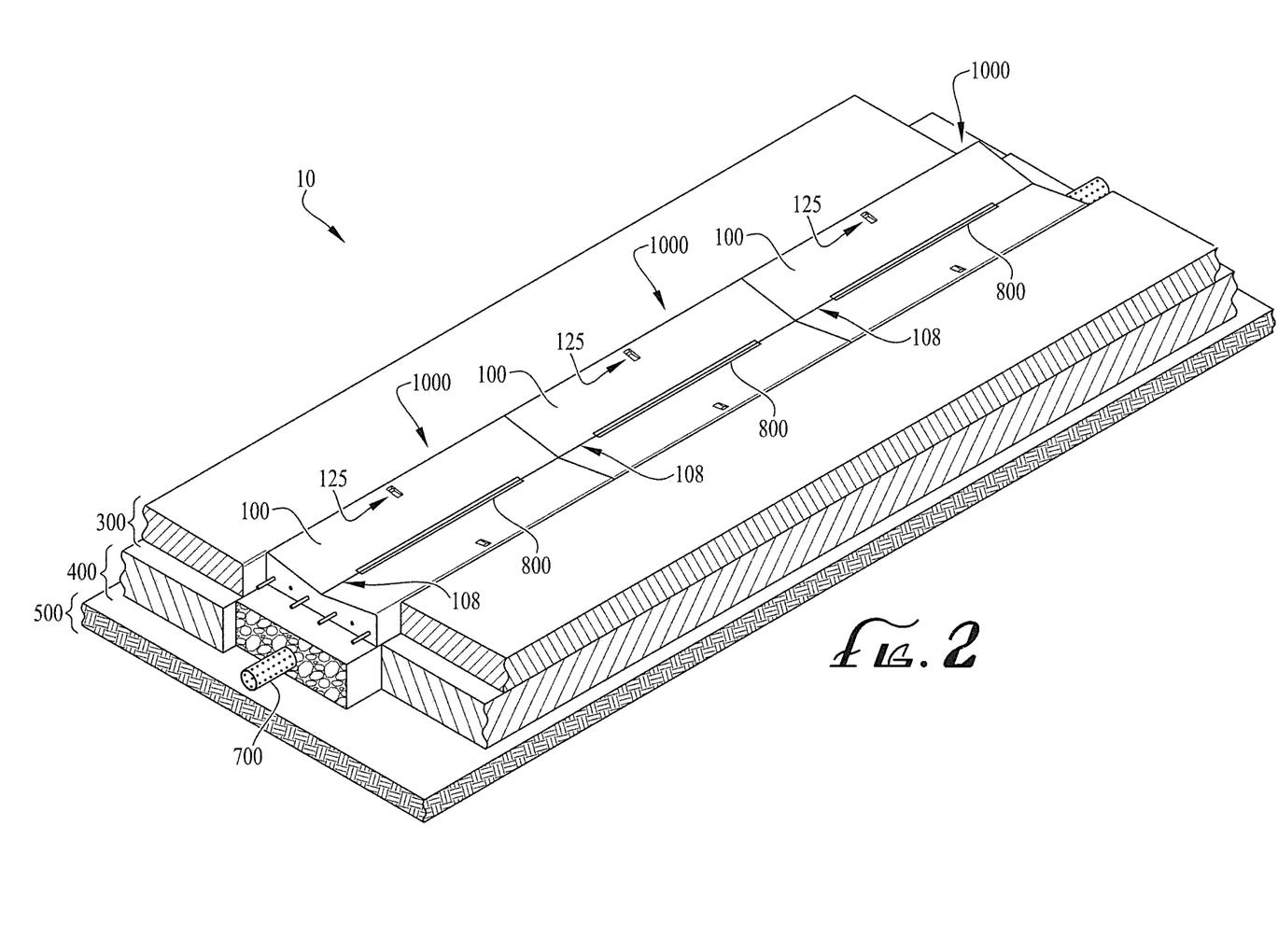
FIG. 2 is an illustration of an assembled, perspective view of the modular porous swale filtration system, according to the first embodiment of the present disclosure.

FIG. 2 is an illustration of an assembled, perspective view of the modular porous swale filtration system 10, according to the first embodiment of the present disclosure. As shown in FIG. 2, the perforated pipe 700 and absorption media 600 may be disposed within the lower portion of the trench 200, whereas each modular porous swale 1000 may be installed at the upper portion of the trench 200. The modular porous swales 1000 may also snugly fit within the trench 200. Importantly, FIG. 2 shows that the modular porous swales 1000 may be installed side-by-side and held together via guides 105 and holes 107. In particular, the guides 105 of a modular porous swale 1000 may mate or engage with holes 107 of an adjacent modular porous swale 1000.

Figure 3:
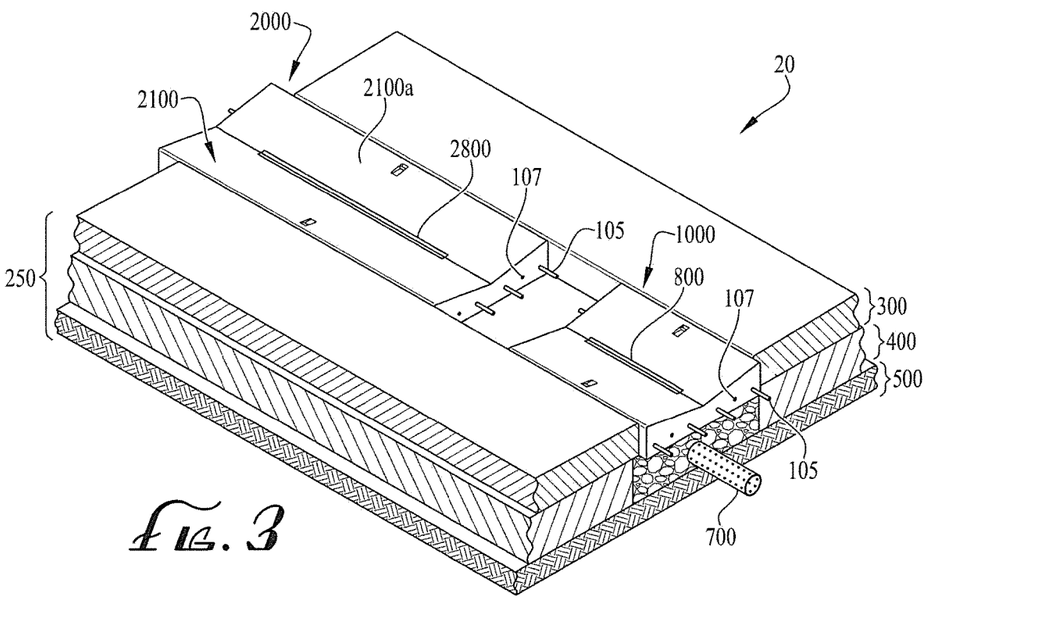
FIG. 3 is an illustration of a perspective view of the modular porous swale filtration system, according to a second embodiment of the present disclosure.

FIG. 3 is an illustration of a perspective view of the modular porous swale filtration system 20, according to a second embodiment of the present disclosure. As shown in FIG. 3, a second embodiment of the modular porous swale filtration system 20 may comprise one or more modular porous swales 2000 having a length longer than the first embodiment, shown in FIGS. 1A to 2. In particular, each modular porous swale 2000 of the modular porous swale filtration system 20 may comprise: a porous concrete block 2100 and a filtration joint 2800, both of which may be longer in length to cover more surface area of the trench 200.

In this embodiment, the porous concrete block 2100 may have a width of approximately 1 feet 8 inches and a length of approximately 4 feet. The height of the porous concrete block 2100 may depend on the elevation of the asphalt layer 300, such that when the porous modular swale 2000 is installed within a trench 200, the elevation of the top surface 2100a of the porous modular swale 2000 is preferably less than or equal to the elevation of the top surface of the ground 250.

Figure 4A:
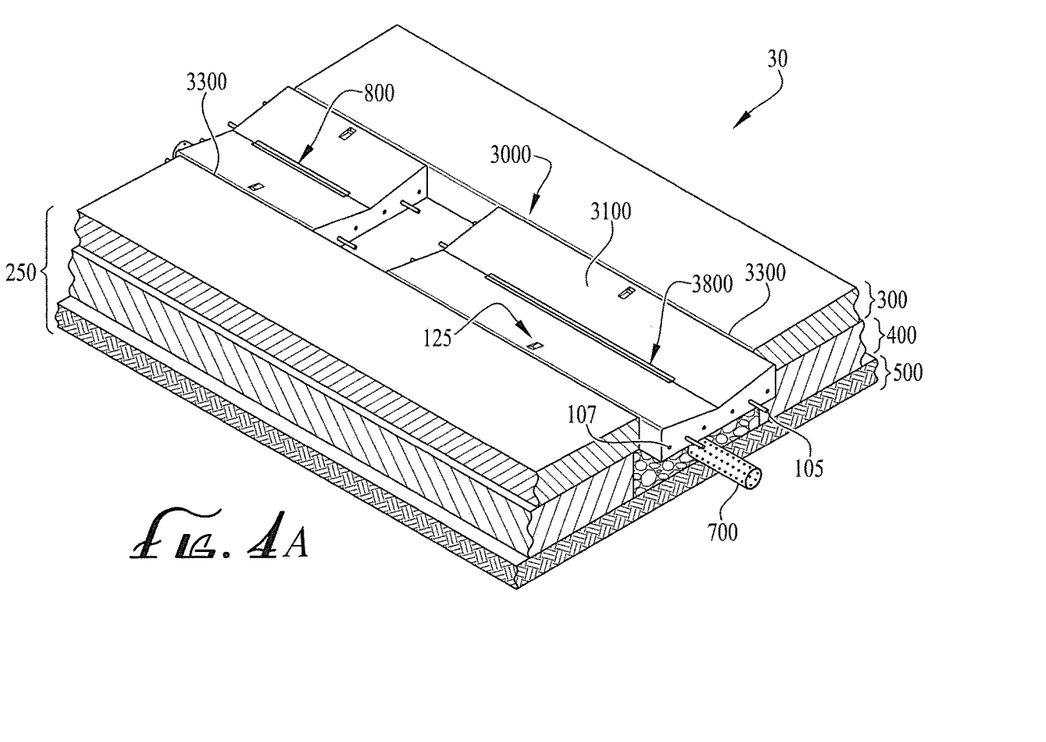
FIGS. 4A to 4C are illustrations of a perspective view, top view, and cross section view, respectively, of the modular porous swale filtration system, according to a third embodiment of the present disclosure.
Figure 4B:
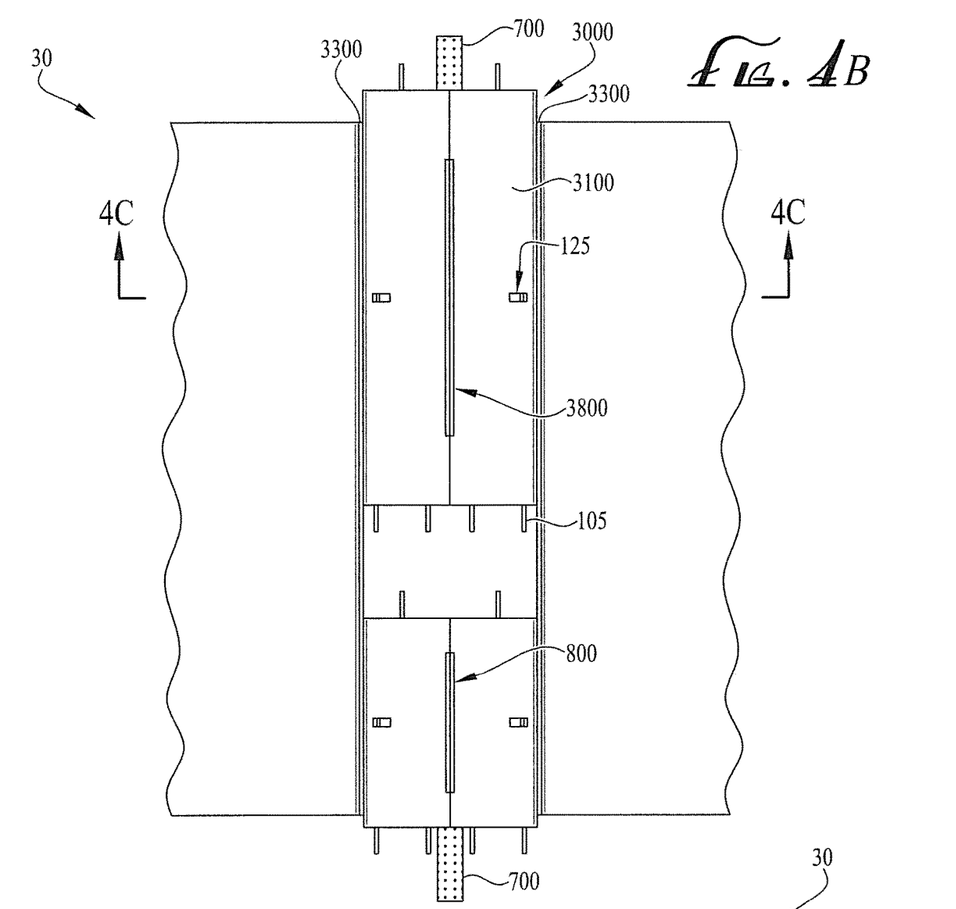
Figure 4C:
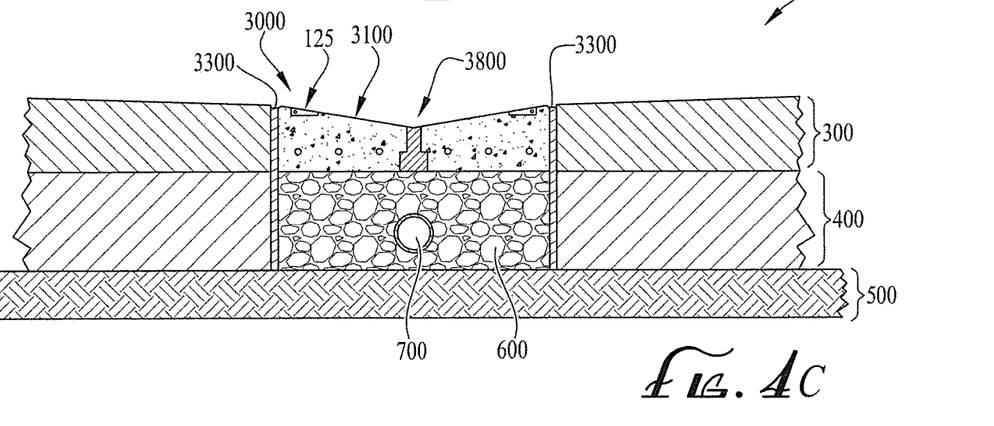

FIGS. 4A to 4C are illustrations of a perspective view, top view, and cross section view, respectively, of the modular porous swale filtration system 30, according to a third embodiment of the present disclosure. As shown in FIGS. 4A to 4C, a third embodiment of the modular porous swale filtration system 30 may comprise: one or more modular porous swales 3000, absorption media 600, and perforated pipe 700, wherein each modular porous swale 3000 may comprise: a porous concrete block 3100 and filtration joint 3800. Unlike the previous embodiments, the third embodiment of the modular porous swale filtration system 30 may also comprise a liner 3300, which may be a material applied to the surfaces or walls of the trench 200 and/or modular porous swale 3000 for added filtration. In multiple embodiments, the liner 3300 may be constructed of either polyethylene or polypropylene.

As shown in FIGS. 4A to 4C, the liner 3300 may cover or coat surfaces of the trench 200. Examples of such surfaces of the trench 200 may include sidewalls of the asphalt layer 300 and base layer 400 and the top surface of the subgrade layer 500. In other embodiments, the liner 3300 may cover or coat the sidewalls and bottom surface of the modular porous swale 3000 or absorption media 600.

Figure 5A:
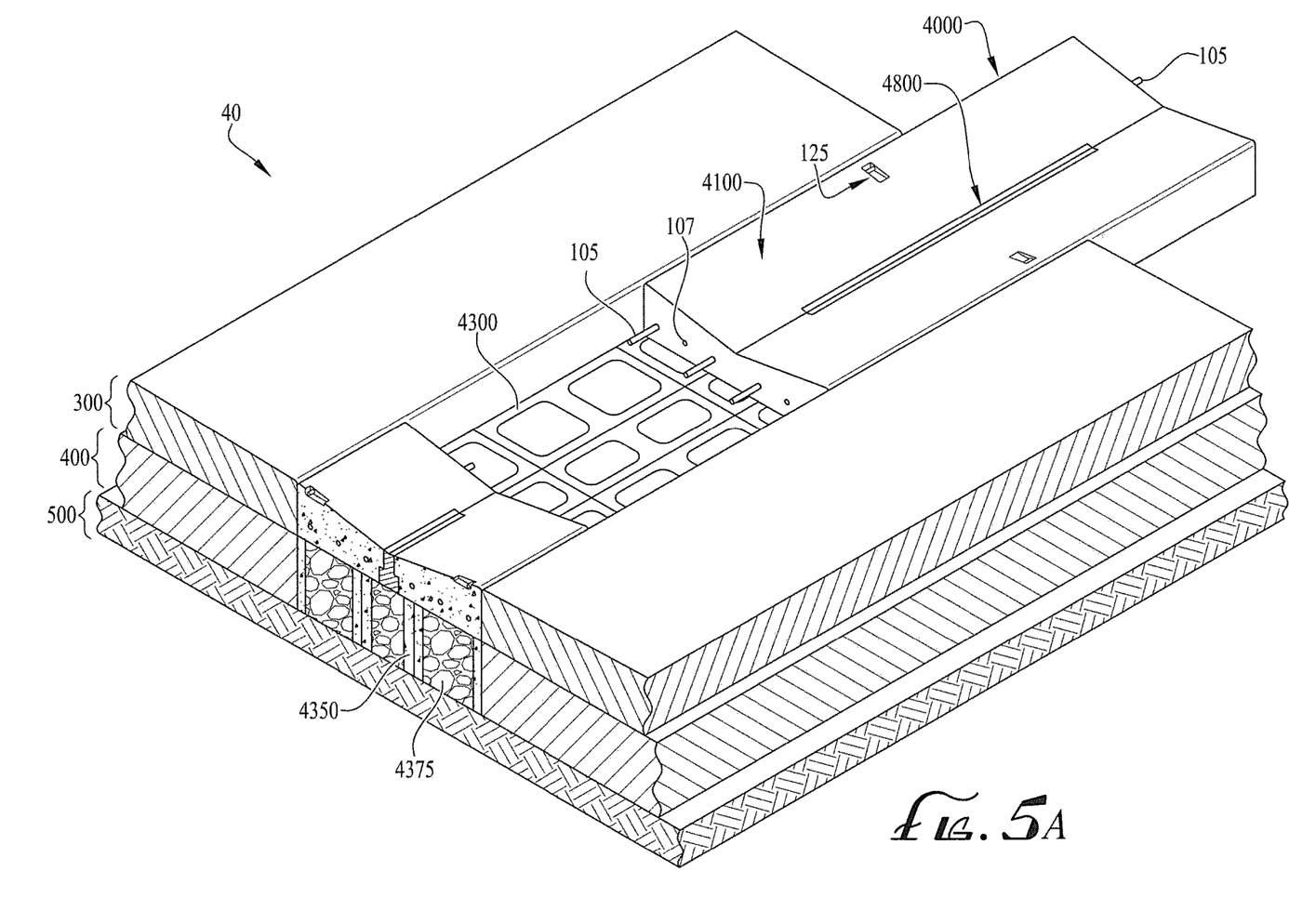
FIGS. 5A to 5C are illustrations of a perspective view, top view, and cross section view, respectively, of the modular porous swale filtration system, according to a fourth embodiment of the present disclosure.
Figure 5B:
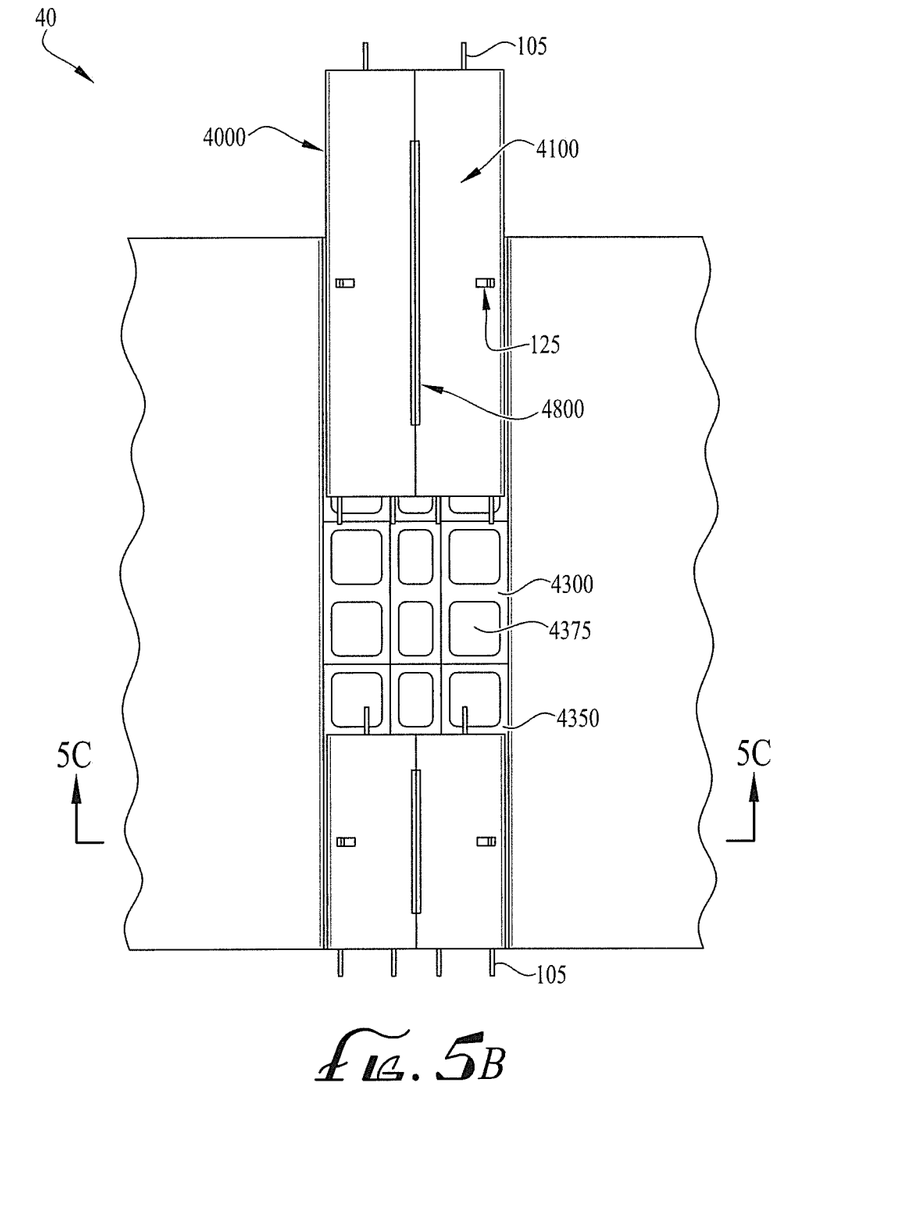
Figure 5C:
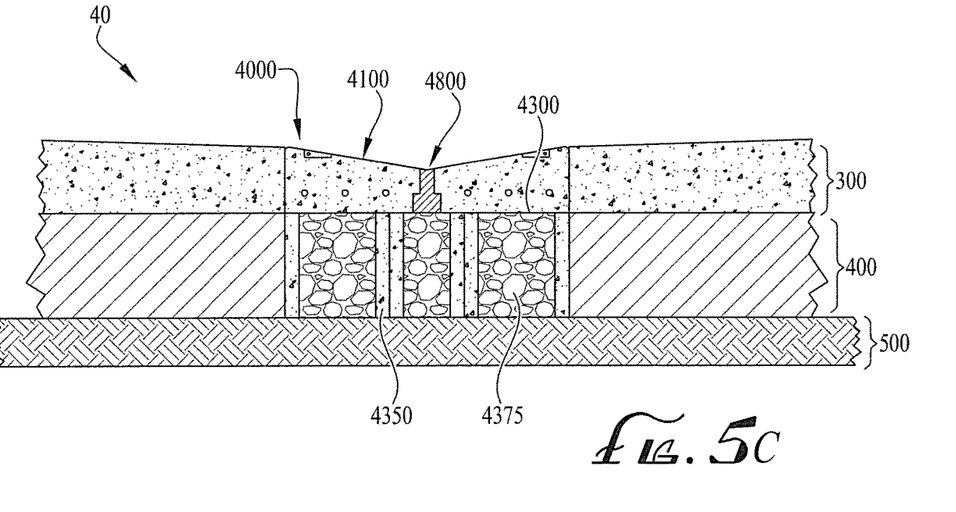

FIGS. 5A to 5C are illustrations of a perspective view, top view, and cross section view, respectively, of the modular porous swale filtration system 40, according to a fourth embodiment of the present disclosure. As shown in FIGS. 5A to 5C, a fourth embodiment of the modular porous swale filtration system 40 may comprise one or more modular porous swales 4000 and concrete support units 4300. The concrete support units 4300 may be used in lieu of absorption media 600 and perforated pipe 700 and may be configured to provide additional vertical support to loads while allowing drainage to the subgrade layer 500 or native soil. Each concrete support unit 4300 may comprise a solid, rectangular structure filled with absorption media 4375, and in various embodiments, each concrete support units 4300 may be a small rectangular block typically constructed of fired or sun-dried clay.

Figure 6:
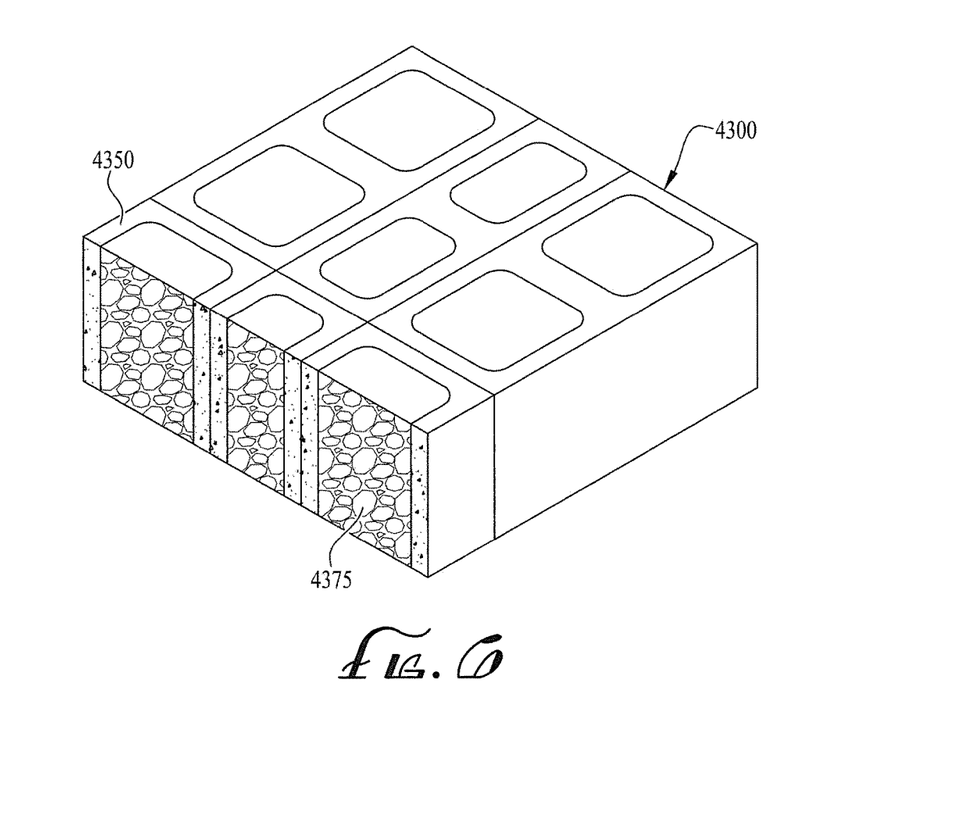
FIG. 6 is an illustration of one embodiment of the concrete support units.

FIG. 6 is an illustration of one embodiment of the concrete support unit 4300. Here, the concrete support unit 4300 may be used in lieu of rock and gravel 600 and perforated pipe 700 and may comprise concrete structures 4350 with absorption media 4375 filled therein. The concrete structures 4350 preferably provide additional structural support to the modular porous swale filtration system 40, and the absorption media 4375 preferably allows drainage of water flowing through the modular porous swale 4000. The absorption media 4375 preferably provides additional filtration and thus allowing water to flow to the subgrade layer 500. Like the previous embodiments, embodiments of absorption media 4375 may include, without limitation, rock, gravel, bone char, biochar, activated alumina, a bone char and activated alumina mixture, and a biochar and activated alumina mixture.

The foregoing description of the embodiments of the modular porous swale filtration system has been presented for the purposes of illustration and description. While multiple embodiments of the modular porous swale filtration system are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the modular porous swale filtration system are described in considerable detail, other versions are possible such as, for example, orienting and/or attaching the modular porous swales in a different fashion. Therefore, the spirit and scope of the appended claims should not be limited to the description of versions included herein.

Except as stated immediately above, nothing, which has been stated or illustrated, is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A modular porous swale, comprising:
   a porous concrete block with a top surface that is inwardly-sloped to a nadir; and
   a filtration joint disposed within said porous concrete block and positioned substantially along said nadir, such that a portion of a liquid located on said top surface of said porous block flows towards said nadir, through said filtration joint, and beneath said porous concrete block;
   wherein said modular porous swale is adapted to snugly fit within an upper portion of a trench; and
   wherein an absorption media is located within a lower portion of said trench, such that said modular porous swale is directly above said absorption media.

2. The modular porous swale, according to claim 1, wherein a perforated pipe is located within said absorption media and traverses along a length of said trench; and
   wherein said filtration joint is configured to substantially align above a portion of said perforated pipe when said modular porous swale is installed within said trench.

3. The modular porous swale, according to claim 1, characterized in that said absorption media is a bone char.

4. The modular porous swale, according to claim 1, characterized in that said absorption media is a biochar.

5. The modular porous swale, according to claim 1, characterized in that said absorption media is an activated alumina.

6. The modular porous swale, according to claim 1, characterized in that said absorption media is a biochar and activated alumina mixture.

7. The modular porous swale, according to claim 1, characterized in that said absorption media is a bone char and activated alumina mixture.

8. A modular porous swale, comprising:
   a porous concrete block adapted to snugly fit within a trench and having a top surface that is inwardly-angled to a nadir located along a centerline of said porous concrete block;
   a filtration joint disposed within said porous concrete block and positioned along said nadir, such that said filtration joint is substantially aligned with said centerline of said porous concrete block, thereby allowing a portion of a liquid located on said top surface of said porous concrete block to flow towards said centerline, through said filtration joint, and beneath said porous concrete block; and a liner substantially covering one or more sides of said porous concrete block, such that said liner substantially covers one or more surfaces of said trench;

wherein an absorption media is located within a lower portion of said trench; and wherein said modular porous swale is positioned directly above said absorption media when said modular porous swale is installed within said trench.

9. The modular porous swale, according to claim 8, wherein a perforated pipe is located within said absorption media and traverses along a length of said trench, such that said filtration joint is configured to substantially align above a portion of said perforated pipe.

10. The modular porous swale, according to claim 8, characterized in that said absorption media is a bone char.

11. The modular porous swale, according to claim 8, characterized in that said absorption media is a biochar.

12. The modular porous swale, according to claim 8, characterized in that said absorption media is an activated alumina.

13. The modular porous swale, according to claim 8, characterized in that said absorption media is a biochar and activated alumina mixture.

14. The modular porous swale, according to claim 8, characterized in that said absorption media is a bone char and activated alumina mixture.

15. The modular porous swale, according to claim 8, characterized in that said liner is selected from the group of liners consisting of: a polyethylene and a polypropylene.

16. A modular porous swale, comprising:
a porous concrete block adapted to snugly fit within a trench and having a top surface that is inwardly-sloped to a nadir located along a centerline of said porous concrete block; and a filtration joint disposed within said porous concrete block and positioned along said nadir, such that said filtration joint is substantially aligned with said centerline of said porous concrete block, allowing a portion of a liquid located on said top surface of said porous concrete block to flow towards said centerline, through said filtration joint, and beneath said porous concrete block;

wherein a lower portion of said trench includes a plurality of concrete support units to provide vertical loading support to said porous concrete block; and wherein each of said plurality of concrete support units comprises a hollow interior filled with an absorption media.

17. The modular porous swale, according to claim 16, characterized in that said absorption media is a biochar.

18. The modular porous swale, according to claim 16, characterized in that said absorption media is an activated alumina.

19. The modular porous swale, according to claim 16, characterized in that said absorption media is a biochar and activated alumina mixture.

20. The modular porous swale, according to claim 16, characterized in that said absorption media is a bone char and activated alumina mixture.

\* \* \* \* \*